United States Patent [19]

Masuda et al.

[11] 3,818,326

[45] June 18, 1974

[54] ROTARY SENSOR USING MAGNETS RESISTANCE DEVICES FOR DETECTING THE ROTATION OF A MECHANICAL SYSTEM

[75] Inventors: Noboru Masuda, Kawaguchi; Yu Nishino, Tokyo, both of Japan

[73] Assignee: Denki Onkyo Co., Ltd., Tokyo, Japan

[22] Filed: June 22, 1972

[21] Appl. No.: 265,255

[30] Foreign Application Priority Data
June 23, 1971 Japan.............................. 46-45430

[52] U.S. Cl. ................ 324/34 PS, 324/45, 338/32, 340/271
[51] Int. Cl. ............................................ G01r 33/00
[58] Field of Search .......... 324/34 PS, 34 D, 45, 46, 324/173, 174; 338/32 R, 32 H; 310/10, DIG. 3, 155, 156; 340/271; 123/148 DK

[56] References Cited
UNITED STATES PATENTS

| | | |
|---|---|---|
| 2,924,633 | 2/1960 | Sichling et al. ..................... 324/46 |
| 3,359,522 | 12/1967 | Albrecht et al. ...................... 324/45 |
| 3,366,909 | 1/1968 | Hini et al. ............................. 324/45 |
| 3,456,097 | 7/1969 | Hini .................................... 324/174 |
| 3,471,722 | 10/1969 | Hini .................................. 333/32 R |

*Primary Examiner*—Robert J. Corcoran
*Attorney, Agent, or Firm*—Armstrong, Nikaido and Wegner

[57] ABSTRACT

A rotary sensor comprised of a frame member having at least two bar yokes which are magnetically connected by a connecting yoke, and a shaft member which is rotated in a space formed between said bar yokes, wherein said shaft member is provided with at least two segment yokes fixed in sequence in the lengthwise direction of the shaft. Said segment yokes are arranged so that their rotating ends are deviated from each other and the bar yokes are provided with the galvano-magneto effect devices so that the devices approach the rotating ends of the segment yokes when the segment yokes are rotated.

9 Claims, 18 Drawing Figures

ROTARY SENSOR USING MAGNETS RESISTANCE DEVICES FOR DETECTING THE ROTATION OF A MECHANICAL SYSTEM

BACKGROUND OF THE INVENTION

The present invention relates to a rotary sensor which provides electric signals in accordance with the rotation of an external mechanical rotating system.

As known, detection of the operation of a mechanical rotating system, control of other mechanical systems and measurement according to an electric signal or calculation of fluid flow have been performed in various industrial fields; therefore, a highly reliable rotary sensor has been necessary.

The present invention fills such the demand and provides a new rotary sensor comprising a magnetic field producing means which varies according to operation of the rotating system and a magnetism sensing resistor element which detects the magnetic field.

SUMMARY

The rotary sensor according to the present invention is comprised of a frame member including at least two magnetic bar yokes which are magnetically shorted by a connecting yoke: these yokes are fixed to oppose each other and a shaft member is secured in the space formed between said bar yokes. The shaft member is provided with a center shaft in parallel with said bar yokes and at least two segment yokes are arranged on the shaft member in sequence so as to intersect at a right angle to the shaft in the lengthwise direction. The segment yokes have at least two free ends which are extended radially from the center shaft. Either one of said frame member or said shaft member is fixed by a retaining means so that it cannot be rotated while the other is rotatably mounted so that it can be rotated by an external mechanical rotating. The segment yokes of said shaft member are arranged so that their free ends are deviated from each other in the direction of rotation of the rotary member. Some of the bar yokes are provided with galvano-magneto effect devices respectively corresponding to said segment yokes so that the devices receive a concentrated magnetic flux when the free ends of the segment yokes of the shaft member approach oppositely the bar yokes of the frame member along with as the rotary member rotates. The frame member and/or the rotary member are provided with a magnetic field generating means which supplies the concentrated magnetic flux between the segment yokes and bar yokes when the free ends of said segment yokes approach the bar yokes, wherein a closed circuit is formed by the bar yokes and segment yokes when said segment yokes oppose projections on said bar yokes. The closed circuit causes said concentrated magnetic flux to be applied to said devices, thereby the devices receive in sequence the concentrated magnetic flux because the free ends of said segment yokes are deviated from each other.

BRIEF DESCRIPTION OF THE DRAWINGS

The present invention is illustrated in detail by the accompanying drawings whereon.

DETAILED DESCRIPTION

Figure 1:
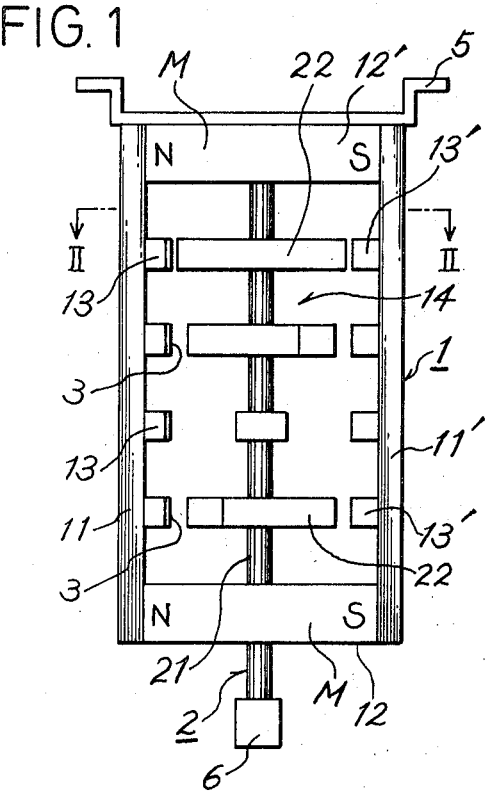
FIG. 1 is a front view of the rotary sensor according to the present invention.
Figure 2:
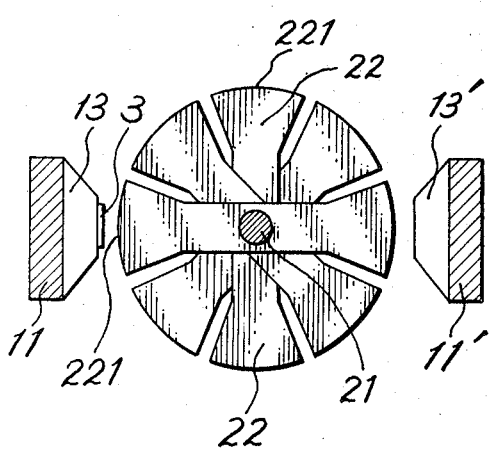
FIG. 2 is a cross sectional plan view as seen along II — II shown in FIG. 1.

Referring to FIGS. 1 and 2, there is shown a rotary sensor comprised of frame member 1 which is fixed by supporting means 5, a shaft member 2, which is a rotary member which is rotated by a mechanical rotating mechanism, and galvano-magneto effect device 3 such as, for example, magneto-resistance effect device or Hall effect device.

Frame member 1 is comprised of bar yokes 11 and 11' which are opposed each other and connecting yokes 12 and 12' which are inserted in space 14 formed between bar yokes 11 and 11' to to retain the yokes opposing each other.

Bar yokes 11 and 11' are provided respectively with at least two projections 13 and 13' in sequence in the lengthwise direction and projection 13 of yoke 11 is opposed to projection 13' of yoke 11' through space 14.

Shaft member 2 is comprised of center shaft 21 inserted into the centers of connecting yokes 12 and 12' and at least two magnetic segment yokes or means 22 which are fixed to said shaft and are respectively provided at least two projected ends which are extended radially from the center shaft.

Said segment yokes 22 are made in the form of a thin strip and are fixed on the center shaft in sequence in its lengthwise direction.

The center shaft is connected to an external mechanical rotating system such as, for example, motor shaft or flow meter by coupling means 6.

Segment yokes 22 are positioned between projections 13 and 13' so that the segment yokes approach projections 13 and 13' of yokes 11 and 11' when their free ends are rotated. Therefore, the reluctance between projections 13 and 13' is suddenly reduced for a specified period of time during one rotation of segment yokes because the projections are magnetically shorted by the segment yokes. Both ends of segment yokes 22 are arched along the direction of rotation and the shape of the arched ends is determined according to the same angle $\theta$ in reference to the center shaft.

The duration of magnetic shorting between projections 13 and 13' by the segment yokes is determined according to the rotating speed of the segment yokes and open angle $\theta$ of arched ends 221.

Figure 3A:
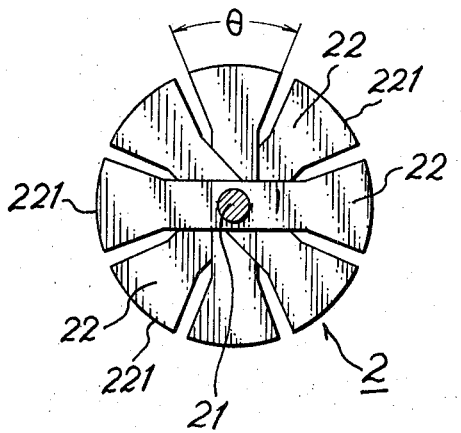
FIGS. 3a to 3c are plan views illustrating an arranging method of a shaft member to be employed in the rotary sensor.
Figure 3B:
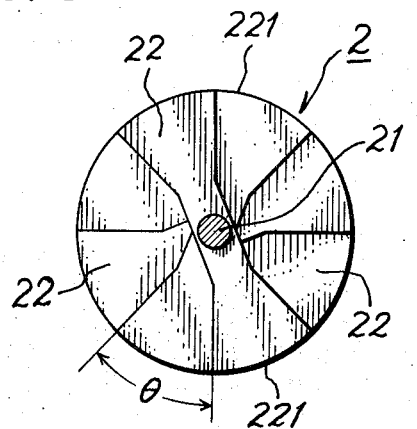
Figure 3C:
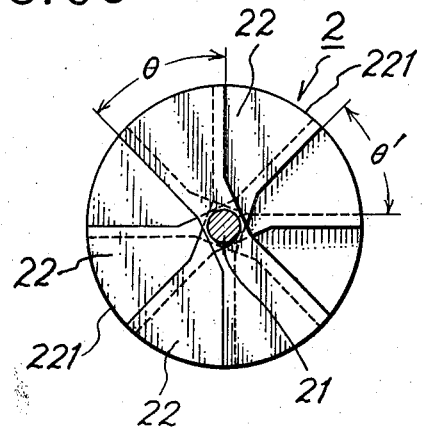

The yokes 22 are mounted on shaft 21 that arched ends 221 so are deviated along the direction of rotation as shown in FIGS. 3a to 3c. Galvano-magneto effect device 3 is fixed to at least one of one pair of said projections 13 and 13'. Accordingly, the devices can be provided in the number as many as the number of rotary yokes.

Figure 4A:
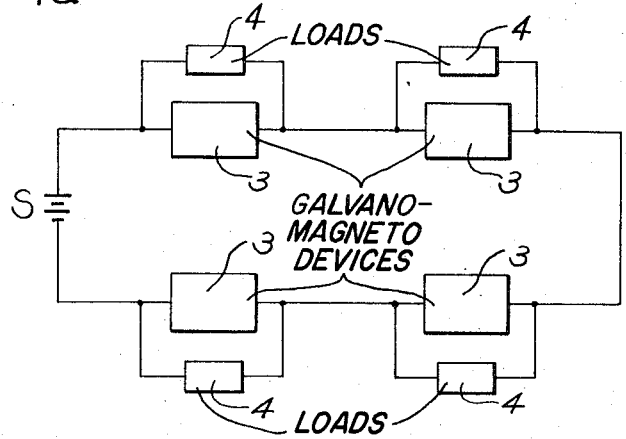
FIGS. 4a to 4d are circuit diagrams of the rotary sensor.
Figure 4B:
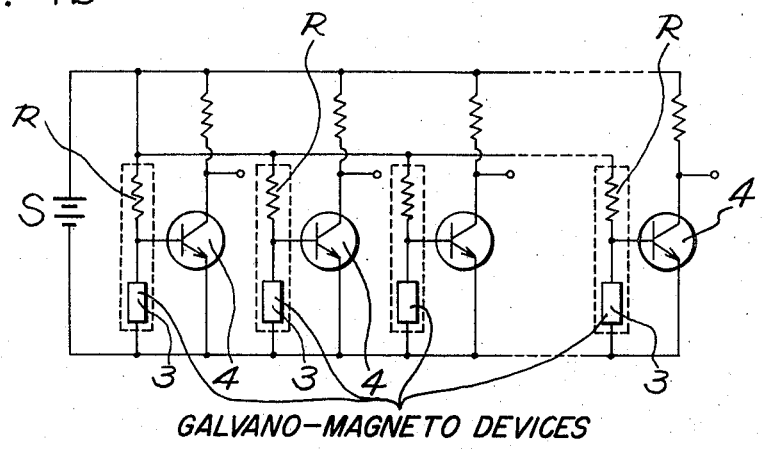

If device 3 is provided at one of a pair of opposed projections 13 and 13', device 3 can be series-connected to power supply S as shown in FIG. 4a and detecting load 4 can be connected to both ends of each device. If device 3 is parallel-connected to power supply S as shown in FIG. 4b, detecting load 4 such as, for example, a transistor can be connected to each device 3. In this case, device 3 and resistor R can be connected in series and the base of the transistor can be connected between device 3 and resistor R.

Figure 4C:
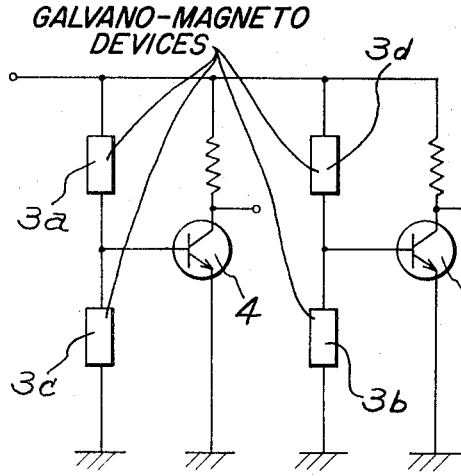
Figure 4D:
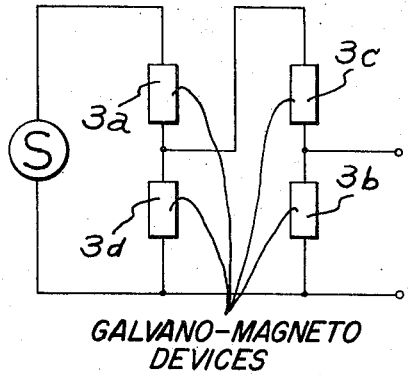
Figure 8:
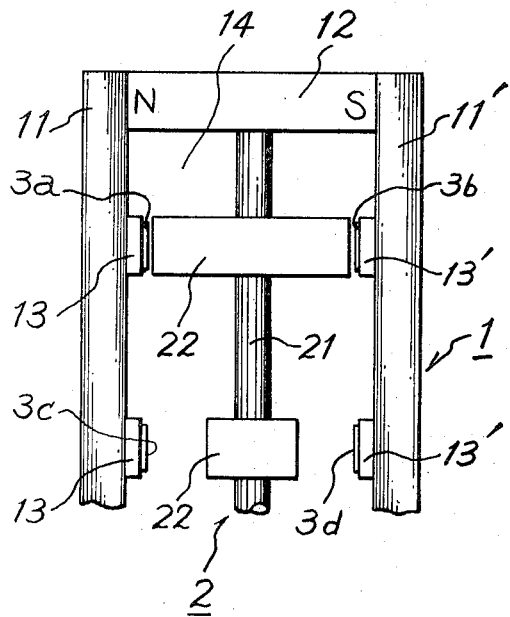
FIG. 8 is a partly magnified front view of the rotary sensor.

If devices 3 are provided at both projections 13 and 13' in a pair opposed each other, and devices 3a, 3b, 3c and 3d are provided as shown in FIG. 8, the devices 3a and 3c as well as 3b and 3d are combined as shown in FIG. 4c and the base of transistor 4 can be connected between the devices of each pair or devices 3a, 3b, 3c and 3d or it can be connected as shown in FIG. 4d.

This rotary sensor contains a magnetic flux generating means, which is generally made up with permanent magnet M as the connecting yoke.

In the embodiment, two connecting yokes are employed but one connecting yoke can be employed. This connecting yoke need not be intended to retain the bar yokes because only magnetic shorting is required.

The rotary sensor according to the present invention is as described above. When center shaft 21 rotates, segment yokes 22 come in sequence into space 14 between bar yokes 11 and 11' to magnetically short projections 13 and 13' and to cause the magnetic flux to concentrate onto device 3. Accordingly, devices 3 provided at projections 13 operate in sequence to actuate load 4. The connecting yoke, bar yokes and segment yoke form a closed magnetic path.

The output characteristic of the rotary sensor differs with the shape of both free ends 221 of segment yokes 22.

If rotating ends 221 of segment yokes 22 which are arranged are not overlapped, the output characteristic is obtained as described below on the assumption that the number of segment yokes is $n$.

$\Delta\theta = \theta - 360°/n < 0$          (1) (FIG. 3a)
$\Delta\theta = \theta - 360°/n = 0$          (2) (FIG. 3b)

When rotating ends 221 of yokes 22 which are arranged to be adjacent one another are overlapped.
$\Delta\theta = \theta - 360°/n > 0$          (3) (FIG. 3c)

Figure 5A:
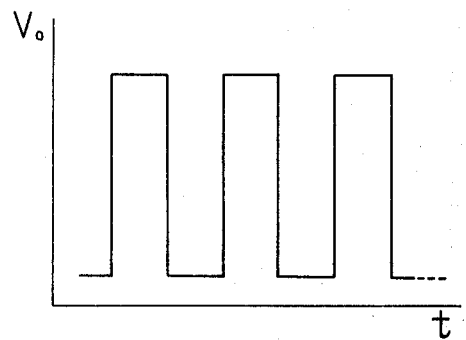
FIGS. 5a to 5c are graphs indicating the output characteristics of the rotary sensor.
Figure 5B:
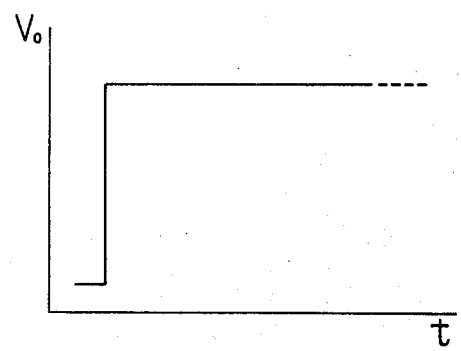
Figure 5C:
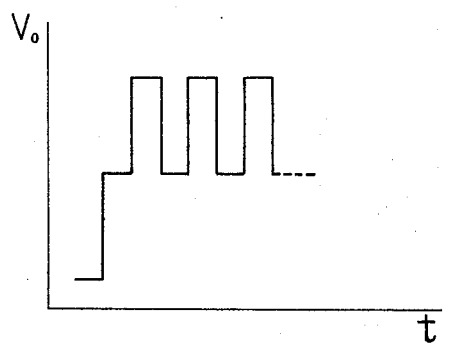

If the output of the rotary sensor is obtained as the sum of variations of resistance of all devices, the output characteristic shown in FIG. 5a is obtained from equation (1), that shown in FIG. 5b form equation (2) and that shown in FIG. 5c form equation (3).

In the graphs, $t$ indicates the duration of rotation and Vo is the output voltage.

In case of equation (1), consecutive pulses are generated; the intervals between pulses are determined with the value of $\Delta\theta$ and the pulse duration is determined with angle $\theta$ of rotating end 221 and the rotating speed of the segment yokes.

In case of equation (2), the specified potential of the output signal is generated.

In case of equation (3), the pulse is generated because the magnetic field corresponding to rotation angle $\Delta\theta$ at which the segment yokes are overlapped is applied to two devices at the same time.

The interval between these pulses is determined with the length of rotating end 221 corresponding to angle $\theta'$ obtained by subtracting $2\Delta\theta$ from open angle $\theta$ rotating end of the segment yoke and the rotating speed of the segment yokes, and the pulse duration is determined with angle $\theta$.

The rotary sensor of the present invention is advantageous because the degree of concentration of magnetic flux onto each device can be higher and the intensity of magnetic field applied to each device can be suddenly varied by the segment yokes.

The output signal can be varied in accordance with the deflection angle of aligned segment yokes, the open angle $\theta$ of the free end of the segment yoke or the overlap of the ends of the segment yokes.

The rotary sensor according to the present invention can be constructed as described below.

Figure 6:
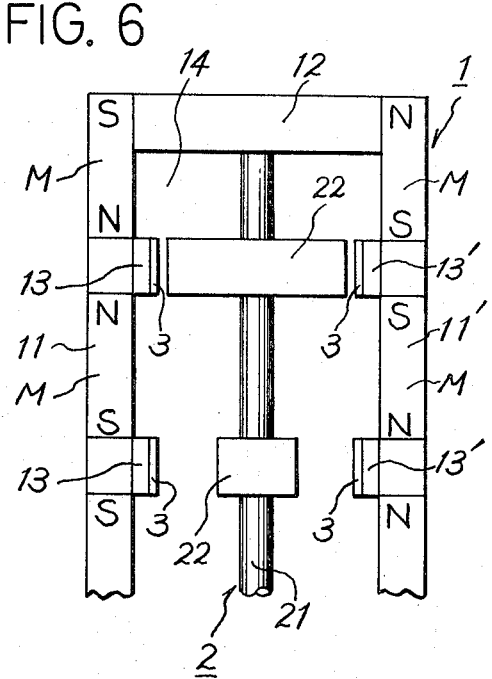
FIGS. 6 and 7 are respectively front views illustrating another embodiment of the rotary sensor.

Magnet M can be incorporated in yokes 11 and 11' as shown in FIG. 6.

In this case, it is desirable to make projections 13 and 13' with different magnetic pieces, and to employ a plurality of magnets in an arrangement where the same polarity poles are opposed through said magnetic piece and to arrange the magnets so that a pair of opposing projections 13 and 13' are magnetized with different polarities.

Segment yokes 22 can be made with magnets so that their rotating ends have a polarity. In this case, there can be two types of embodiments.

Figure 7:
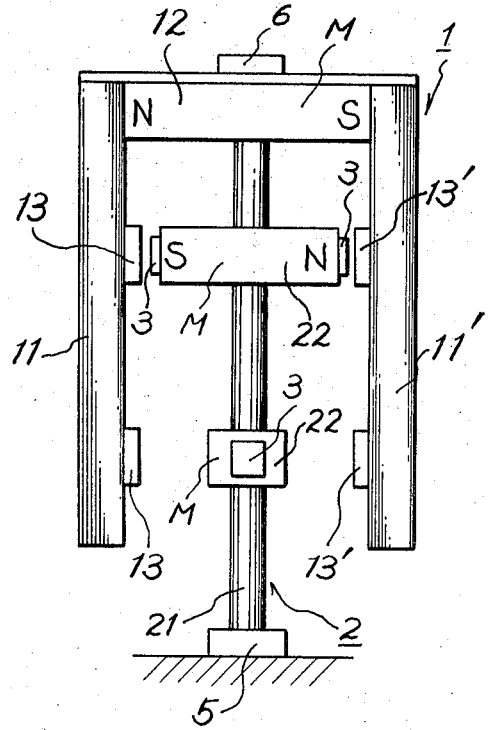

In the first embodiment, as shown in FIG. 7, magnet M is contained in frame member 1. In this case, both ends of segment yokes 22 and projections 13 and 13' have the same or different polarity during one rotation of segment yokes.

In the second embodiment, only the segment yokes are made of magnets M. In this case, the same effect as in the embodiment shown in FIG. 1 is obtained.

Center shaft 21 can rotate relatively in reference to frame member 1.

Accordingly, frame member 1 can be rotated, depending on the case. In FIG. 7, frame member 1 is connected to an external mechanical rotating system by coupling means 6 while devices 3 are fixed at segment yokes 22.

Figure 9:
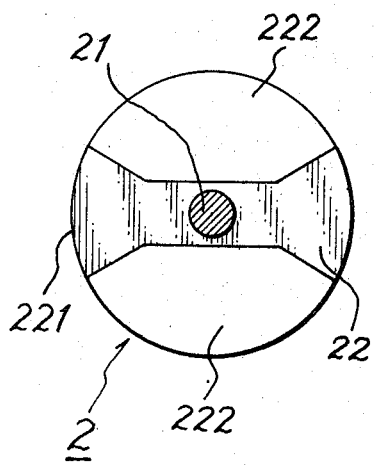
FIG. 9 is a plan view illustrating another embodiment of the shaft member to be employed in the rotary sensor.

As shown in FIG. 9, segment yokes 22 can be formed in the shape of disc by attaching non-magnetic semi-circular piece 222 to both sides of barrels.

As shown in FIG. 2, the ends of projections 13 and 13' are preferred to be thin. Thus, the concentration effect of magnetic flux can be improved.

Figure 10:
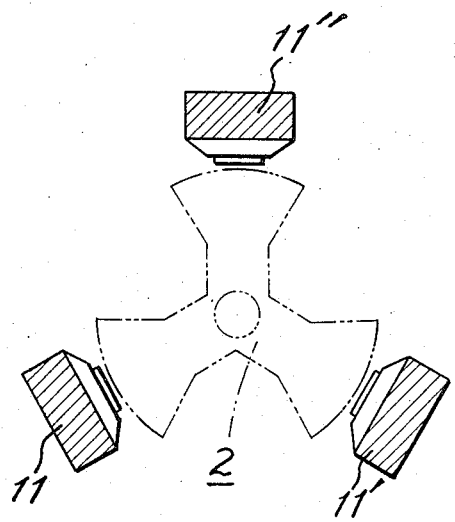
FIGS. 10 and 11 are respectively plan views illustrating another embodiment of a frame member of the rotary sensor.
Figure 11:
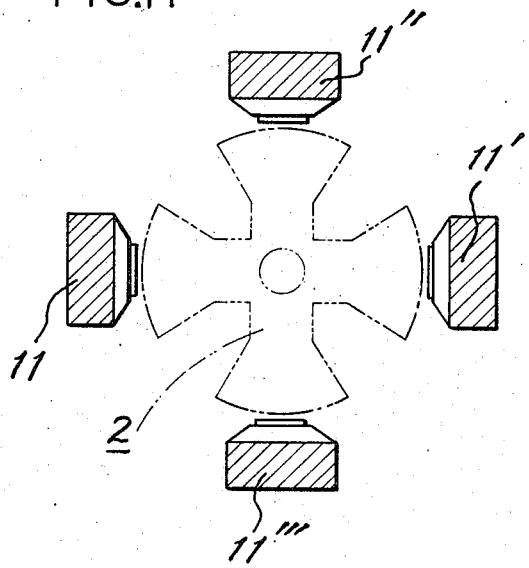

The bar yokes of frame member 1 should be at least two. But for example, as shown in FIG. 10, the bar yokes can be three, 11, 11' and 11'', and as shown in FIG. 11, they can be four, 11, 11', 11'', 11'''.

The rotary sensor according to the present invention is advantageous because a plurality of output signals can be produced during one rotation of the segment yokes.

What is claimed is:

1. A rotary sensor comprising:
 a. a frame member including at least two magnetic bar yokes which are magnetically shorted and positioned parallel to each other wherein at least a pair of said bar yokes comprises alternately arranged magnetic pieces and magnets, wherein said magnets are arranged with interpositioned magnetic pieces so that like poles of the magnets are opposed to each other;

b. a shaft member comprising a center shaft provided in a space formed between said bar yokes so as to be parallel with the bar yokes, and at least two elongated magnetic segment means, said segment means being mounted at a point between the ends thereof perpendicular to the axis of the shaft and at different points along the length of the shaft, and intersecting the shaft such that the plane formed by the axis of the shaft and the longitudinal axis of each segment means is different for each segment means, wherein the magnetic pieces of each bar yoke on opposite sides of said shaft are in the same plane perpendicular to said shaft and are magnetized with opposite polarities and wherein each of said segment means lies in the plane of a pair of magnetic means perpendicular to said shaft;

c. a retaining means which fixes one of said frame member or shaft member so that it cannot be rotated;

d. a connecting means which couples the other of said shaft member or frame member to an external mechanical rotating system; and, e. at least two galvano-magneto effect devices positioned on said frame member each said galvano-magneto effect device being in the plane of a corresponding segment means, wherein the concentrated magnetic flux from said magnets is applied to said galvano-magneto effect devices when the ends of said segment means approach the bar yokes.

2. A rotary sensor according to claim 1, wherein the frame member is fixed and the shaft member is made rotatable.

3. A rotary sensor according to claim 1, wherein said magnetic pieces project into a space formed in the frame.

4. A rotary sensor according to claim 3, wherein the portions of said magnetic pieces which project into said space are tapered.

5. A rotary sensor according to claim 1, wherein the shaft member is fixed and the frame member is made rotatable.

6. A rotary sensor according to claim 1, wherein each segment yoke includes a non-magnetic piece fitted to magnetic portions thereof to form a disc.

7. A rotary sensor according to claim 1, wherein the ends of the segment means are arched in the direction of rotation.

8. A rotary sensor according to claim 7, wherein the arched ends of each segment means overlap with the ends of other segment means.

9. A rotary sensor according to claim 1, wherein the ends of each segment means do not overlap with the ends of other segment means.

* * * * *